(12) United States Patent
Daum et al.

(10) Patent No.: US 8,906,133 B2
(45) Date of Patent: Dec. 9, 2014

(54) PROCESS AND PLANT FOR COOLING SULFURIC ACID

(75) Inventors: Karl-Heinz Daum, Mainz (DE); Wolfram Schalk, Hagen (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/575,993

(22) PCT Filed: Jan. 11, 2011

(86) PCT No.: PCT/EP2011/000074
§ 371 (c)(1),
(2), (4) Date: Jul. 30, 2012

(87) PCT Pub. No.: WO2011/091950
PCT Pub. Date: Aug. 4, 2011

(65) Prior Publication Data
US 2013/0000869 A1    Jan. 3, 2013

(30) Foreign Application Priority Data
Feb. 1, 2010    (DE) .......................... 10 2010 006 541

(51) Int. Cl.
| | | |
|---|---|---|
| *B01D 47/00* | (2006.01) | |
| *F01K 17/06* | (2006.01) | |
| *F01K 23/06* | (2006.01) | |
| *C01B 17/80* | (2006.01) | |
| *C01B 17/765* | (2006.01) | |
| *B01J 8/26* | (2006.01) | |
| *F28D 7/16* | (2006.01) | |
| *F28D 9/00* | (2006.01) | |

(52) U.S. Cl.
CPC .................. *C01B 17/806* (2013.01); *B01J 8/26* (2013.01); *F28D 7/16* (2013.01); *F01K 17/06* (2013.01); *F01K 23/064* (2013.01); *F28D 9/00* (2013.01); *C01B 17/7655* (2013.01)

USPC .......... 95/1; 95/227; 95/235; 96/242; 96/244; 423/242.1; 423/522; 423/531

(58) Field of Classification Search
CPC .......................................................... B01J 8/26
USPC ........... 237/56–68; 165/58–66; 423/160, 161, 423/240 R–245.1, 453, 522, 528–532, 423/539–543, 573.1
See application file for complete search history.

(56) References Cited

U.S. PATENT DOCUMENTS 2,766,442 A * 10/1956 Meyer, Jr. .................... 165/11.1
4,576,813 A * 3/1986 McAlister et al. ............ 423/522

(Continued)

FOREIGN PATENT DOCUMENTS

| DE | 10128032 A1 | 12/2002 |
| DE | 10128774 A1 | 12/2002 |
| DE | 102005008109 A1 | 8/2006 |

OTHER PUBLICATIONS

Dawson Co. Engineering Community Blog. Steam Control & Condensate Drainage for Heat Exchangers. Jun. 27, 2006. Accessed Jun. 17, 2013. <http://dawsoncoengineers.blogspot.com/2006/06/steam-control-condensate-drainage-for.html>.*

(Continued)

*Primary Examiner* — Duane Smith
*Assistant Examiner* — Joubert X Glover
(74) *Attorney, Agent, or Firm* — Leydig, Voit & Mayer, Ltd.

(57) ABSTRACT

A process for cooling an acid that is withdrawn from an absorption apparatus of a sulfuric acid plant includes pumping the acid to be cooled from an acid pump tank and supplying the acid to a shell space of a heat exchanger. Water is supplied as a heat transport medium to heat transfer elements disposed in the shell space so as to at least partially convert, by heat transfer from the acid, the water to steam. The acid which was cooled in the heat exchanger is supplied back to the absorption apparatus. The water is separated from the steam in a steam drum. The separated water is recirculated to the heat exchanger using a pump.

12 Claims, 2 Drawing Sheets

(56) References Cited

U.S. PATENT DOCUMENTS

| | | | |
|---|---|---|---|
| 4,996,038 | A | 2/1991 | McAlister |
| 7,225,863 | B2 | 6/2007 | Anastasijevic et al. |
| 7,837,970 | B2 | 11/2010 | Daum |
| 2004/0238375 | A1 | 12/2004 | Daum et al. |

OTHER PUBLICATIONS

Raman, Aravamudhan. 2007 (Digitized Dec. 2007) Industrial Press, Inc. Materials Selection and Applications in Mechanical Engineering. Louisiana State University.*

Mueller, Hermann, "Sulfuric Acid and Sulfer Trioxide", Ullmann's Encyclopedia of Industrial Chemistry, Jan. 1, 2000. p. 1-71.

Sander et al., "Sulphur, Sulphur Dioxide, and Sulphuric Acid", Jan. 1984, British Sulphur Corporation, London, p. 299-315.

Connock, L., "Systems for Enhanced Energy Recovery", Sulphur, British Sulphur Publishing, London, GB, No. 278, Jan. 1, 2002. p. 41-47.

Ullmann's Encyclopedia of Industrial Chemistry, 5th edition, vol. A25, VCH Verladagesellschaft mbH, Jan. 1994, p. 635 to 700.

* cited by examiner

PROCESS AND PLANT FOR COOLING SULFURIC ACID

CROSS-REFERENCE TO PRIOR APPLICATIONS

This application is a U.S. National Phase application under 35 U.S.C. §371 of International Application No. PCT/EP2011/000074, filed on Jan. 11, 2011, and claims benefit to German Patent Application No. DE 10 2010 006 541.2, filed on Feb. 1, 2010. The International Application was published in English on Aug. 4, 2011 as WO 2011/091950 A2 under PCT Article 21(2).

FIELD

The present invention relates to the cooling of acid which is withdrawn from an absorption apparatus of a sulfuric acid plant, wherein the acid is pumped from an acid pump tank into a heat exchanger and subsequently is again supplied to the absorption apparatus, wherein water as heat transport medium is heated in the heat exchanger with the heat of the acid and is at least partly converted into steam, and wherein the water is separated from the steam.

BACKGROUND

Sulfuric acid usually is produced by the so-called double absorption process as it is described in Ullmann's Encyclopedia of Industrial Chemistry, 5th edition, vol. A25, pages 635 to 700. Sulfur dioxide ($SO_2$) obtained as waste gas of metallurgical plants or by combustion of sulfur is converted to sulfur trioxide ($SO_3$) in a multistage converter by means of a solid catalyst, e.g. with vanadium pentoxide as active component. The $SO_3$ obtained is withdrawn after the contact stages of the converter and supplied to an intermediate absorber or after the last contact stage of the converter to a final absorber in which the gas containing $SO_3$ is guided in counterflow to concentrated sulfuric acid and absorbed in the same.

The absorption of the $SO_3$ in sulfuric acid is a strongly exothermal process, so that the acid is heated up and must be cooled again. At the same time, the heat of the acid can be utilized for steam generation and energy recovery. Due to the temperatures of distinctly >140° C., which exist during the sulfuric acid absorption, acid cooling so far has exclusively been effected in kettle-type boilers, wherein the hot acid flows through U-shaped tubes to be passed through a kettle filled with water as heat transport medium. The circulation here is based on the thermosiphon principle. The heated water is converted into low-pressure steam and rises due to the lower density. The steam can be utilized in the plant (cf. Ullmann's Encyclopedia of Industrial Chemistry, loc. cit. p. 662).

While such kettle-type boilers have a simple construction and therefore can be manufactured at low cost, large amounts of water are required for filling the kettle type boiler. In addition, problems can arise when leakages occur in the acid circuit. Since acid leaks from the tubes into the water tank, a large amount of a highly corrosive weak acid is obtained, whose temperature in addition greatly rises due to the hydration heat produced. The corrosion resistance of the steels used in the system greatly drops below a sulfuric acid concentration of 99.1 wt-% (steel 310SS) or 97.9 wt-% (steel 3033). There is a risk of damage of the tube bundle or even of the entire kettle-type boiler. In addition, the acid/water mixture can only be separated with a disproportionate effort, so that in practice the user mostly will have to completely empty one or both of the systems.

SUMMARY

In an embodiment, the present invention provides a process for cooling an acid that is withdrawn from an absorption apparatus of a sulfuric acid plant. The acid to be cooled is pumped from an acid pump tank and supplying the acid to a shell space of a heat exchanger. Water is supplied as a heat transport medium to heat transfer elements disposed in the shell space so as to at least partially convert, by heat transfer from the acid, the water to steam. The acid which was cooled in the heat exchanger is supplied back to the absorption apparatus. The water is separated from the steam in a steam drum. The separated water is recirculated to the heat exchanger using a pump.

BRIEF DESCRIPTION OF THE DRAWINGS

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following.

DETAILED DESCRIPTION

Figure 1:
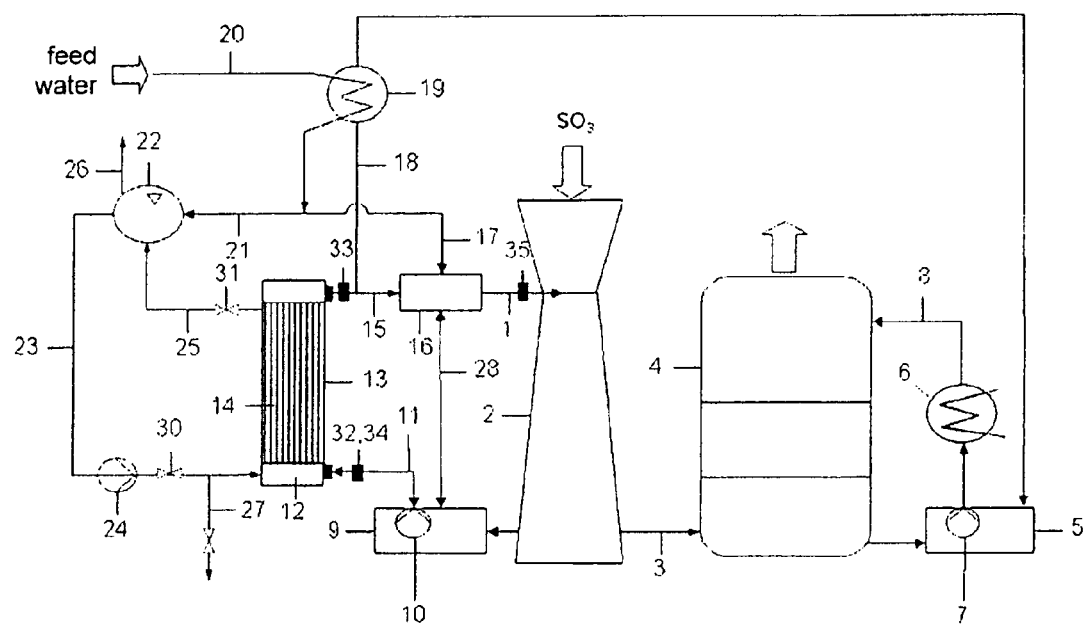
FIG. 1 schematically shows a plant for performing the process in accordance with an embodiment of the invention.

In an embodiment, the present invention provides for a reliable cooling of sulfuric acid and increases the safety of the plant.

In accordance with an embodiment of the invention, the acid is supplied to a shell space of the heat exchanger and the water is supplied to heat transfer elements arranged in the shell space and at least partly converted into steam, the steam generated in the heat exchanger is separated from water in a steam drum, and the water thus obtained is recirculated to the heat exchanger by means of a pump.

As in the heat exchanger less water is brought in contact with the acid than in the conventional kettle-type boiler filled with water, the amount of water mixed with acid is distinctly reduced in the case of a leakage. Since the functions of the conventional kettle-type boiler are split up into the separate elements heat exchanger, steam drum and recirculation pump, handling additionally is facilitated in the case of a leakage. Water and acid circuit can easily be separated.

To further reduce the risks in the acid cooling circuit, a fast error detection is desired. As soon as an error is detected, the supply of water to the heat exchanger can be switched off and the error can be eliminated.

In accordance with an embodiment of the invention, the interruption of the inflow of water is initiated e.g. upon measurement of a changed acid concentration. For this purpose, various measurement points are provided, which preferably are based on different measurement principles. In the absorber, methods can be used in particular which determine the concentration of the acid via the conductivity, whereas in the cooling stage around the associated heat exchanger the sound velocity in the medium or the refractive index of the acid preferably is determined. A redundancy of the instruments and measurement principles used ensures that the acid concentration can safely be determined at any time.

However, the acid concentration only can effectively be used for leakage detection when it is linked with the process water stream. At the beginning, leaks usually are small, so that only small amounts of water enter into the acid circuit. As a result, the acid concentration is decreased, but this is compensated by the process control in that less process water is added. The larger the leak becomes, the more process water is replaced by the water leaking in the heat exchanger. In this way, a uniform acid concentration is maintained. The leakage in the heat exchanger, however, only is detected when the process water valve is completely closed and the acid concentration still continues to drop. The equipment then would probably already be severely damaged. In accordance with an embodiment of the invention, the process water supply, the plant loading and the acid concentration therefore are monitored at the same time.

In accordance with a particularly preferred embodiment of the invention the temperature of the acid is measured at the inlet and outlet of the heat exchanger and linked with the flow rate of the heat transport medium supplied to the heat exchanger. Via the temperature difference $\Delta T$, the heat balance can be created via the heat exchanger. A leakage in the heat exchanger will lead to a disturbance of the heat balance, since water enters into the acid circuit and generates additional heat. The ratio between the steam produced and the heat produced in the heat exchanger is changed, which can serve as a control variable for an interruption of the water flow.

To check the composition of the boiler feed water, its conductivity is measured in accordance with an embodiment of the invention directly behind the heat exchanger. Since the pressure on the water/steam side of the heat exchanger is distinctly higher than on the acid side, there is usually no risk of major amounts of acid entering into the water circuit. For leakage monitoring, this measurement can therefore only be used to a restricted extent.

An embodiment of the invention also relates to a plant suitable for performing the process described above for cooling acid which is withdrawn from an absorption apparatus of a sulfuric acid plant, with a heat exchanger to which the hot acid is supplied from an acid pump tank by means of a pump and in which heat is transferred from the acid to a heat transport medium, in particular water, with a steam generator in which steam is generated from the heat transport medium, and with a return conduit for at least partly recirculating the cooled acid to the absorption apparatus. In accordance with an embodiment of the invention, the heat exchanger is a tube bundle heat exchanger with a plurality of tubes or a plate heat exchanger with a plurality of plates as heat transfer elements, wherein the heat exchanger is connected with the acid pump tank and the return conduit as well as via a conduit with a steam drum to which the heated heat transport medium is supplied from the heat exchanger and in which the steam generated is separated from the water, and wherein the steam drum is connected with the heat exchanger via a recirculation conduit for the circulation of water.

In a first embodiment of the invention a shell space of the heat exchanger surrounding the heat transfer elements is connected with the acid pump tank and the return conduit, and the heat transfer elements of the heat exchanger are connected with the recirculation conduit and with the steam drum.

Alternatively, it can be provided in accordance with an embodiment of the invention to connect the shell space of the heat exchanger surrounding the heat transfer elements with the recirculation conduit and the steam drum and to connect the heat transfer elements of the heat exchanger with the acid pump tank and the return conduit.

In the tube bundle or plate heat exchangers provided in accordance with an embodiment of the invention, the amount of water to be supplied to the tube, plate or respective shell volume is substantially lower than in the conventionally used kettle-type boilers due to the high packing densities used today. The amount of water/acid mixture produced in a case of leakage thus is also reduced.

In accordance with an embodiment of the invention it is provided that the heat exchanger is arranged at a higher level than the acid pump tank. When the acid pump is switched off, the heat exchanger thus is emptied gravimetrically without further action. Further safety installations, which would have to withstand the contact with hot acid, are not necessary.

In the recirculation conduit a circulation pump is provided in accordance with an embodiment of the invention, in order to circulate the cooling water by force.

For adjusting the optimum acid concentration for the operation of the absorber, a mixing chamber preferably is provided in the return conduit to the absorption apparatus, in which the recirculated acid is mixed with process feed water.

Between the heat exchanger and the steam drum and/or in the recirculation conduit a shut-off valve expediently is provided, in order to uncouple the heat exchanger from the water circuit upon occurrence of an error and for maintenance work.

Shutting off the water supply to the heat exchanger is effected e.g. upon detection of a leakage. In accordance with an embodiment of the invention, temperature measurement stations for detecting the acid temperature therefore are provided before and behind the heat exchanger and/or concentration measurement stations are provided before the heat exchanger and/or the absorber for detecting the acid concentration.

When a plurality of heat exchangers are provided parallel to each other in accordance with an embodiment of the invention, one of the heat exchangers can be uncoupled and repaired or maintained in a case of damage or maintenance, while the other continues to operate. The flexibility of the plant is increased thereby and a continuous operation is promoted.

As can be taken from the flow diagram of the process of the invention as shown in FIG. 1, gaseous sulfur trioxide from a converter for converting $SO_2$ into $SO_3$ is introduced into a Venturi absorber 2 in cocurrent flow with concentrated sulfuric acid supplied via a conduit 1 and is partly absorbed in the hot acid, whose concentration is increased thereby. Via a conduit 3 the non-absorbed sulfur trioxide is introduced into an intermediate absorber 4, which it traverses in counterflow to concentrated sulfuric acid for further absorption. Non-absorbed sulfur trioxide is withdrawn from the top of the intermediate absorber 4 and supplied to a catalytic conversion stage, while the enriched sulfuric acid is withdrawn at the bottom, partly removed as product or otherwise utilized in the plant, and upon dilution with water in an acid pump tank 5 and cooling in a heat exchanger 6 the rest is recirculated by means of a pump 7 via the conduit 8 to the intermediate absorber 4.

Sulfuric acid withdrawn at the bottom of the Venturi absorber 2 is supplied to an acid pump tank 9 and is introduced from the same by means of a pump 10 via the conduit 11 into the shell space 12 of a heat exchanger 13 located at a higher level, in which the acid is cooled by means of water as heat transport medium.

The heat exchanger 13 preferably constitutes a tube bundle heat exchanger with a plurality of water-conveying tubes 14 serving as heat transfer elements, since here a particularly good heat transfer can be combined with a relatively small volume of heat transport medium. Alternatively, a plate heat exchanger can be used.

Via a conduit 15, the cooled acid flows into a mixing chamber 16 in which its concentration is adjusted to the desired value by means of process feed water supplied via a conduit 17, before the sulfuric acid is supplied to the Venturi absorber 2. Part of the acid can be branched off via a conduit 18 and be supplied to the acid pump tank 5 of the intermediate absorber 4. The elevated acid temperature can be utilized to heat up the process feed water in a heat exchanger 19.

The feed water is supplied via a conduit 20 and after heating in the heat exchanger 19 divided into the process feed water stream of conduit 17, which is supplied to the mixing chamber 16, and a stream supplied to a steam drum 22 via a conduit 21. Boiler feed water is withdrawn from said steam drum via a recirculation conduit 23 and supplied to the heat exchanger 13 by means of a circulation pump 24. In the heat exchanger 13, the boiler feed water is guided in cocurrent flow with the hot sulfuric acid supplied from the acid pump tank 9 and is heated up, so that a water/steam mixture is formed, which is supplied via the conduit 25 to the steam drum 22 and separated there. The steam is withdrawn via the conduit 26, while the water is recirculated to the heat exchanger 13. The sulfuric acid correspondingly is cooled in the heat exchanger 13. Although a cocurrent cooling is shown in the drawing, it is of course within the scope of the invention to guide the acid and the cooling water in countercurrent flow. The remaining plant construction is not influenced thereby.

As in the heat exchanger less water is brought in contact with the acid than in the conventional kettle-type boiler, the amount of water mixed with the acid is distinctly reduced in the case of a leakage. In a system in a tube bundle heat exchanger of the invention, which is comparable in terms of cooling capacity, about 2 m$^3$ of water (about 36 m$^3$ of acid) are contained, whereas a conventional kettle-type boiler contains about 10 m$^3$ of water (about 30 m$^3$ of acid). In the case of water and acid being intermixed completely (worst case) in the configuration of the invention, this leads to a dilution of the sulfuric acid supplied from the absorber with a concentration of about 99 wt-% and a temperature of about 200° C. to 95.6 wt-% and an increase in temperature to 230° C., whereas in the case of a leakage in the conventional kettle-type boiler the acid is diluted to 81 wt-% and the temperature rises to 274° C. Such a sulfuric acid has a reducing effect and is highly corrosive. Since the materials of the heat exchanger are designed for an oxidizing stress acting with a sulfuric acid concentration >90 wt-%, considerable damages will occur very quickly.

In the conduits 23, 25 shut-off valves 30, 31 are provided, by means of which the heat exchanger 13 can be separated from the water circuit e.g. for maintenance and repair purposes. The water from the heat exchanger 13 can be removed via a drainage conduit 27.

Since the heat exchanger 13 is arranged above the acid pump tank 9, the acid automatically runs back into the acid pump tank 9 merely by gravity when the pump 10 is switched off, which acid pump tank 9 has an acid-proof lining like the absorbers 2, 4 and the acid pump tank 5. Additional mechanical drainage means can be omitted. In addition, the user is not exposed to the hot acid.

At the inlet and outlet of the heat exchanger 13 the acid temperature is measured via sensors 32, 33. In addition, a plurality of concentration measurement stations 34, 35 are provided in the acid circuit, which are used for determining the acid concentration at the inlet of the heat exchanger 13 and at the inlet of the Venturi absorber 2, respectively. At the inlet of the Venturi absorber 2, the conductivity of the acid preferably is measured, whereas at the inlet of the heat exchanger 13 the sound velocity in the acid or its refractive index is measured. Due to the redundancy of the measurement stations and principles, a reliable control of the acid concentration is ensured, which can be adapted if necessary by supplying process feed water via the conduit 17 or acid from the acid pump tank 9 via a conduit 28.

From the temperature measurement 32, 33 at the inlet and outlet of the heat exchanger 13, the amount of heat transferred to the water can be calculated. The temperature difference $\Delta T$ over the heat exchanger can be expressed as a function of the heat exchanger feed water. This function represents the heat balance over the heat exchanger and describes an almost constant curve which is independent of the plant loading and other process conditions. A leakage in the heat exchanger will lead to a disturbance of the heat balance, since water enters into the acid circuit and generates additional heat. The ratio between the steam produced and the heat produced in the heat exchanger is changed, which can serve as a control variable for an interruption of the water flow. The volume flows of the water discharged and introduced likewise can be used for leakage detection, since the same are in equilibrium in stationary operation.

Figure 2:
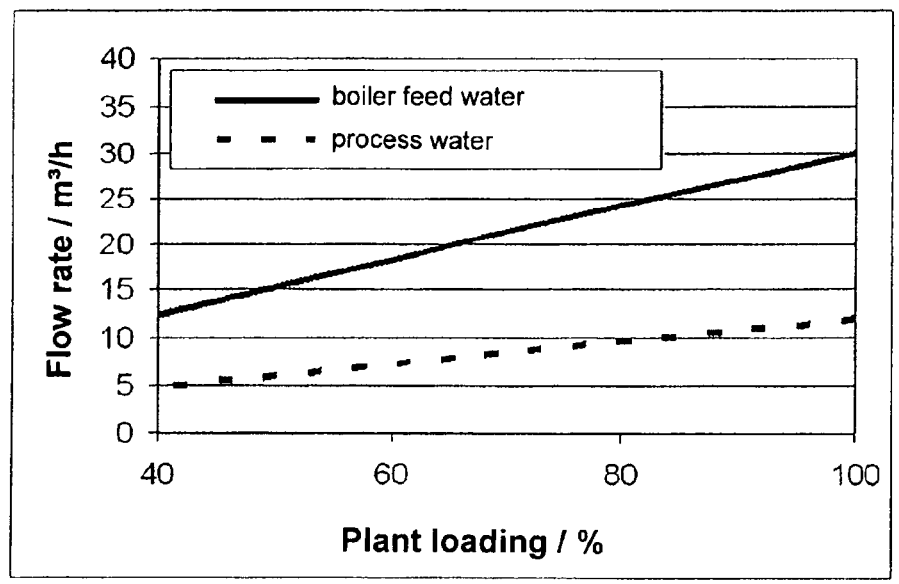
FIG. 2 shows the course of the process water and boiler feed water streams in dependence on the plant loading.
Figure 3:
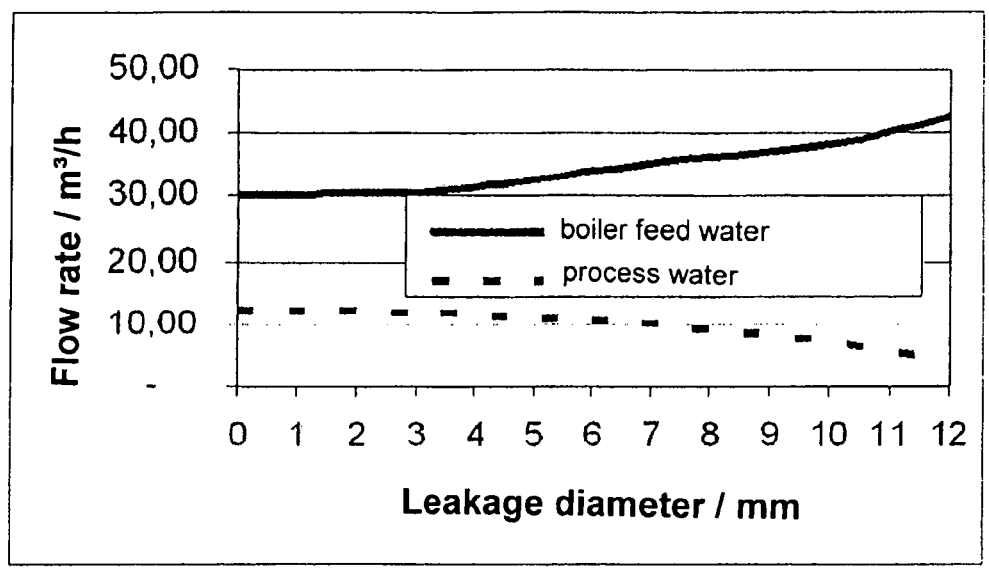
FIG. 3 shows the course of the process water and boiler feed water streams in dependence on the leak size.

In the case of normal operation, the boiler feed water stream and the process water stream represent linear curves dependent on the plant loading, as is shown in FIG. 2. In the case of a leakage, the temperature is increased due to the entry of water into the acid, whereby more water is required in the cooling circuit. At the same time, the concentration of the acid is decreased, so that less process water is admixed to the acid. This is illustrated in FIG. 3. In dependence on the size of the leak, the demand of boiler feed water rises, whereas the supply rate of the process water goes down.

In accordance with the invention, the boiler feed water stream is linked with the plant loading. When a fixed alarm level is exceeded, the acid pump 10 is switched off and the heat exchanger 13 is separated from the water circuit, in order to be able to perform the necessary repair.

When several heat exchangers 13 are provided in parallel, one heat exchanger can run on, whereas the other is maintained or repaired.

In the described embodiment, the acid is supplied to the shell space 12 and the cooling water is supplied to the tubes 14 or plates of the heat exchanger 13. However, the invention also covers the reverse case, in which the cooling water is supplied to the shell space 12 and the acid is supplied to the tubes 14 or plates of the heat exchanger 13.

Even if the acid temperature at the outlet of the intermediate absorber 4 generally is too low because of the lower amount of SO$_3$ absorbed, in order to be economically used for energy recovery, the arrangement described above for the cooling circuit of the Venturi absorber 2 can also be provided in principle for the intermediate absorber 4. Likewise, instead of the Venturi absorber 2 in the first absorption stage there can also be used a countercurrently operated absorption tower similar to the intermediate absorber 4. The second absorption stage possibly can also be omitted.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 conduit
2 Venturi absorber
3 conduit
4 intermediate absorber
5 acid pump tank
6 heat exchanger
7 pump
8 conduit
9 acid pump tank
10 pump
11 conduit
12 shell space
13 heat exchanger
14 tube
15 conduit
16 mixing chamber
17, 18 conduit
19 heat exchanger
20, 21 conduit
22 steam drum
23 recirculation conduit
24 circulation pump
25, 26 conduit
27 drainage conduit
28 conduit
30, 31 shut-off valves
32, 33 temperature sensors
34, 35 concentration measurement stations

The invention claimed is:

1. A process for cooling an acid that is withdrawn from an absorption apparatus of a sulfuric acid plant, the method comprising:
   pumping the acid to be cooled from an acid pump tank and supplying the acid to a shell space of a heat exchanger;
   supplying water as a heat transport medium to heat transfer elements disposed in the shell space so as to at least partially convert, by heat transfer from the acid, the water to steam;
   supplying the acid which was cooled in the heat exchanger back to the absorption apparatus;
   separating the water from the steam in a steam drum;
   recirculating the separated water to the heat exchanger using a pump; and
   simultaneously monitoring process water supply, loading of the plant and concentration of the acid so as to detect a leakage.

2. The process according to claim 1, further comprising measuring a temperature of the acid at an inlet and at an outlet of the heat exchanger and linking the measurement with a flow rate of the heat transport medium supplied to the heat exchanger.

3. A plant for cooling an acid that is withdrawn from an absorption apparatus of a sulfuric acid plant, the plant comprising:
   an acid pump tank;
   a heat exchanger connected to the acid pump tank and containing, in a shell space of the heat exchanger, the acid to be cooled from the acid pump tank, the heat exchanger being at least one of a tube bundle heat exchanger having a plurality of tubes as heat transfer elements and a plate heat exchanger having a plurality of plates as heat transfer elements, the heat transfer elements containing water as a heat transport medium so as to transfer heat from the acid to the water and so as to provide a steam generator that generates steam from the water using the heat from the acid;
   a return conduit connected to the heat exchanger and configured to at least partially recirculate the acid which was cooled in the heat exchanger to the absorption apparatus;
   a steam drum connected to the heat exchanger via a conduit and configured to receive the heat transport medium which was heated by the acid in the heat exchanger, the steam drum being configured to separate the water from the steam;
   a recirculation conduit connected to the steam drum and configured to recirculate the water which was separated from the steam into the heat exchanger; and
   a leakage detection unit configured to simultaneously monitor process water supply, loading of the plant and concentration of the acid and to provide an indication of a leakage based on the monitoring.

4. The plant according to claim 3, wherein the shell space of the heat exchanger surrounding the heat transfer elements is connected with the acid pump tank and the return conduit, and wherein the heat transfer elements of the heat exchanger are connected with the recirculation conduit and with the steam drum.

5. The plant according to claim 3, wherein the heat exchanger is disposed at a higher level than the acid pump tank.

6. The plant according to claim 3, further comprising a circulation pump disposed in the recirculation conduit.

7. The plant according to claim 3, further comprising a mixing chamber disposed in the return conduit to the absorption apparatus and configured to mix the recirculated acid with process feed water.

8. The plant according to claim 3, further comprising a shut-off valve disposed between the heat exchanger and the steam drum.

9. The plant according to claim 3, further comprising a shut-off valve disposed in the recirculation conduit.

10. The plant according to claim 3, further comprising temperature measurement stations disposed at an inlet and at an outlet of the heat exchanger and configured to detect a temperature of the acid.

11. The plant according to claim 3, further comprising concentration measurement stations disposed at an inlet to at least one of the heat exchanger and the absorption apparatus and configured to detect the concentration of the acid.

12. The plant according to claim 3, wherein a plurality of the heat exchangers are disposed parallel to each other.

* * * * *